(12) United States Patent
DeVries

(10) Patent No.: US 7,358,006 B2
(45) Date of Patent: Apr. 15, 2008

(54) ELECTROMAGNETIC PULSE PROTECTED FUEL CELL POWER SYSTEM

(75) Inventor: Peter David DeVries, Spokane, WA (US)

(73) Assignee: Genesis FuelTech, Inc., Spokane, WA (US)

( * ) Notice: Subject to any disclaimer, the term of this patent is extended or adjusted under 35 U.S.C. 154(b) by 708 days.

(21) Appl. No.: 10/779,361

(22) Filed: Feb. 13, 2004

(65) Prior Publication Data

US 2004/0161654 A1    Aug. 19, 2004

Related U.S. Application Data

(60) Provisional application No. 60/447,362, filed on Feb. 14, 2003.

(51) Int. Cl.
*H01M 8/02* (2006.01)
(52) U.S. Cl. ......................... 429/34; 429/35
(58) Field of Classification Search ............ 429/34–35, 429/12
See application file for complete search history.

(56) References Cited

U.S. PATENT DOCUMENTS

| | | | |
|---|---|---|---|
| 4,943,494 A * | 7/1990 | Riley | 429/30 |
| 6,372,983 B1 * | 4/2002 | Knaggs | 174/17 LF |
| 2002/0090540 A1 | 7/2002 | Einhart et al. | |
| 2004/0033411 A1 * | 2/2004 | Lersch et al. | 429/34 |
| 2004/0161654 A1 * | 8/2004 | DeVries | 429/34 |

FOREIGN PATENT DOCUMENTS

WO    WO02/45193    6/2002

* cited by examiner

*Primary Examiner*—Mark Ruthkosky
(74) *Attorney, Agent, or Firm*—Andrus, Sceales, Starke & Sawall, LLP

(57) ABSTRACT

A fuel cell power system is protected from electromagnetic pulse energy damage through the use of a protective enclosure. In addition, electrical lines entering or exiting the system contain voltage or current spike suppression devices sufficient to prevent damage to the electronics contained within the enclosure. Also, any openings in the enclosure will have electromagnetic pulse attenuating grids or honeycomb covers, and any viewing ports through the enclosure may be protected with transparent conductive materials, such as indium tin oxide coated onto glass.

12 Claims, 1 Drawing Sheet

ELECTROMAGNETIC PULSE PROTECTED FUEL CELL POWER SYSTEM

CROSS-REFERENCE TO RELATED APPLICATION

This application is based on and claims priority from provisional patent application Ser. No. 60/447,362 filed on Feb. 14, 2003.

FIELD OF THE INVENTION

This invention relates to fuel cells and hydrogen-producing fuel processors for critical applications, where the electrical components of the system are protected from electromagnetic pulse energy damage through the use of a protective enclosure and means to prevent energy from entering and damaging the electronics through electrical lines entering or leaving the enclosure.

BACKGROUND OF THE INVENTION

As technological advances continue to be made, fuel cell power systems are becoming an increasingly viable source of electrical power. Potential uses vary from miniature power systems for hand-held scanners up to electromotive power for oceangoing vessels. As broad commercialization of fuel cell systems occurs, the need for high reliability in special applications will certainly arise.

One of the potential problems for fuel cell power systems lies in the extensive use of electronics for controlling and managing the function of the system and power flow of the electrical energy. Microcontrollers and voltage-sensitive transistors (such as MOSFETs) are commonly used for such purposes. These electronics are sensitive to sudden variations in voltage which can irreparably damage them.

Sudden spikes in voltage can occur from outside sources such as lightning strikes, high-altitude nuclear detonations, and electromagnetic-pulse weapons. These events have the capability of completely destroying the electronics used to control a fuel cell power system. Protection from such events thus enables the fuel cell power system to be utilized in applications where exposure to such risks are unacceptable.

SUMMARY OF THE INVENTION

In order to prevent electromagnetic pulse damage to the electronics of a fuel cell power system, or fuel cell power system sub-components, it is necessary to apply sufficient shielding to lower the energy of the incoming wave to below the damage threshold of the electrical system. This damage threshold can vary depending on the type of electronics employed and their physical arrangement within the system.

To reflect or attenuate an electromagnetic pulse, an enclosure may be placed around the fuel cell power system or fuel processor. This enclosure may be made of steel, which can reflect electromagnetic energy, or aluminum if a lighter enclosure is needed. Other metals or alloys of metals may be employed. The metal may also be coated with a dissipative material which attenuates wave energy; this coating may be applied to the interior, the exterior, or to both sides of the enclosure. Other materials which attenuate electromagnetic pulse energy may also be employed. This can include, for instance, plastics containing small particles of materials which cause the enclosure to attenuate the wave energy as it passes through the enclosure.

Fuel cell systems, including fuel processors for fuel cell systems, will typically require the use of ambient air for fuel cell cathode oxygen, the burner in a fuel processor, and for cooling. This requires openings in the enclosure used for the device. Depending on the size and location of the opening, the opening may act as a conduit or window for damaging electromagnetic energy to enter. To prevent such damage, the opening may be covered with a metallic screen or honeycomb material which serves to partially reflect incoming waves and to attenuate the wave entering through the lattice. The exact spacing and depth of the grids or the honeycomb material will determine the extent of the attenuation for a given wave. The selection of a particular arrangement or material for covering an air opening into the fuel cell system or fuel processor will depend on the type of electronics employed within the enclosure, the type of wave expected to reach the device, and the level of protection desired. Other means may also be employed, such as convoluted ducting with energy absorbing material placed on the walls of the ducts.

Besides openings for air, a fuel cell system will also typically have power lines exiting the device, so that the fuel cell power system can supply energy to electrical devices. These lines can inductively couple with electromagnetic pulses to produce voltage and current spikes which travel into the enclosure through the electrical lines. These spikes can cause damage if they reach sensitive electronic devices.

To prevent these spikes from causing damage, electrical lines entering or leaving the enclosure may either be shielded (such as a coaxial cable), or devices may be added to the lines to suppress or attenuate the spike. These devices can include high frequency filters, voltage spike suppressors, isolation transformers, and the like, and are generally known to those skilled in the art.

These measures, in separate or in combination, may be used to prevent an electromagnetic pulse from damaging the electronics of a fuel cell power system or a fuel processor.

DETAILED DESCRIPTION OF THE INVENTION

Figure 1:
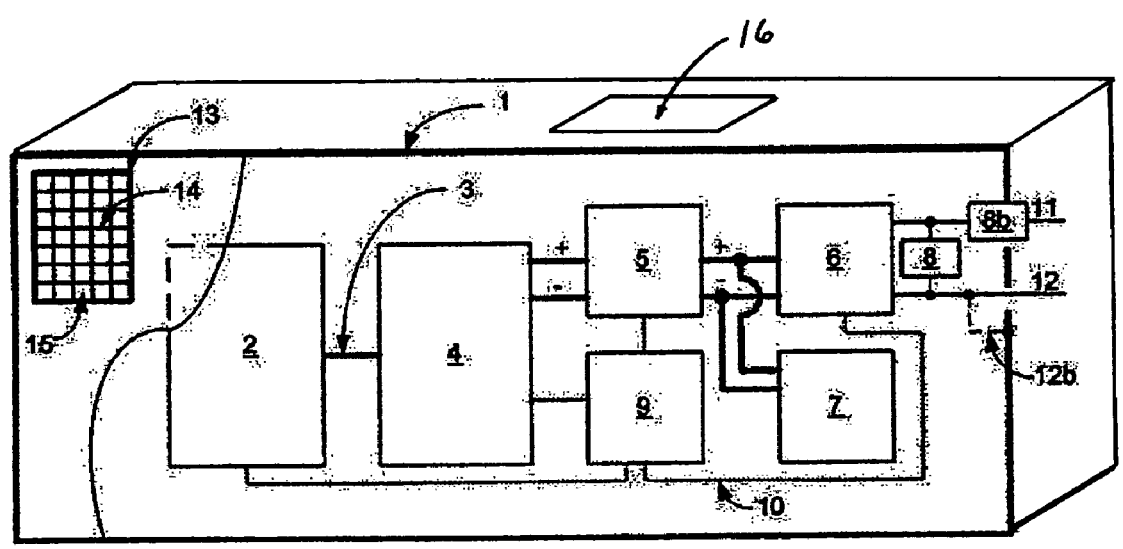
FIG. 1 is a schematic drawing illustrating a fuel cell power system incorporating electromagnetic pulse protection in accordance with the present invention.

FIG. 1 illustrates a typical embodiment of a fuel cell power system with electromagnetic pulse protection. Energy reflecting and dissipating enclosure 1 surrounds the fuel cell system components. The hydrogen generating fuel processor 2 contained within enclosure 1 feeds hydrogen to fuel cell 4 via hydrogen feed line 3. Electrical energy produced by the fuel cell 4 is conditioned by DC-DC converter 5, which in turn sends power to DC-AC converter 6 and energy storage device 7. System control electronics 9 controls components in enclosure 1 via control lines 10. This includes the obvious necessities such as transducers, valves, etc. needed to sense and control the system adequately.

In some applications certain components may not be required. For example, if bottled hydrogen is used, or if the fuel cell is a direct-methanol or other type, the hydrogen-generating fuel processor 2 may not be needed. Likewise, if DC output is desired the DC-AC converter 6 may be deleted, and in the event that external power storage devices such as batteries or ultracapacitors are used, the energy storage device 7 may be deleted from the interior of enclosure 1. Although less desirable, the DC-DC converter 5 may also be deleted from enclosure 1.

Power may exit the enclosure via cables 11 and 12. If desired the ground cable of the two may be electrically bonded to the enclosure via optional grounding cable 12b. Other cables, such as control or communication lines, may enter the enclosure 1, although these are not illustrated.

Some or all lines entering the enclosure 1 may require electromagnetic pulse protection means, generally illustrated as protection device 8. Protection device 8 may include a variety of devices for voltage or current spike suppression, such as a breakdown diode, capacitor, etc. Additional protection may be placed in-line, as shown in 8b. Ground referenced protection devices as 8 and in-line protection devices such as 8b may be placed on any electrical line entering or leaving the enclosure 1 as necessary to protect the enclosed electronics 9. In addition, any lines leaving or entering the enclosure 1 may also be shielded, such as with coaxial shielding, to prevent damaging pulses from entering the enclosure.

Since most typical fuel cell systems will require the exchange of air for a variety of purposes, enclosure 1 in FIG. 1 is illustrated with a typical air exchange vent 13. Air exchange vent 13, in the preferred embodiment, will have electromagnetic pulse attenuating grids or honeycomb cover 14 placed over the opening. These grids or honeycomb covers 14 will typically be electrically bonded to the enclosure 1. Air enters or leaves air exchange vent 13 through holes 15 in the grid cover 14. Additional openings in the enclosure, such as viewing ports or windows 16 made of glass or other transparent plastic material, may be protected with other means such as transparent conductive materials coated onto a glass or transparent plastic viewing port, for example indium tin oxide coated onto glass.

EMI (Electromagnetic Interference) or EMP (Electromagnetic Pulse)

Shielding Examples

| | Frequency, Hz | Attenuation, dB |
|---|---|---|
| Type - Tecknit (Cranford, NJ) | | |
| ECTC windows ™, 70% light transmission coated glass 14 ohms/square coating | 10 MHz | >90 |
| Teckfilm ™ Transparent polyester film with conductive coating | 10 MHz | >90 |
| Teckshield ® Glass, acrylic, or polycarbonate window with metal mesh | 10 MHz | >120 |
| Vent panel Teckcell ™ aluminum, steel, brass honeycomb (.125" wide cells by 0.5" deep) | 10 MHz | >105 |
| Teckscreen ™ vent panel aluminum wire screen (3 layers) | 10 MHz | >120 |
| Holland Shielding Systems, B.V. (Dordrecht, The Netherlands) | | |
| 3801 Conductive paint (nickel particles in paint) | 100 MHz | 38 |
| Mu-copper foil with optional self-adhesive backing (magnetic & electrical damping properties) | 18 MHz | 100 |

A crowbar device can also be used and it begins to break down with a positive resistance until the device reaches a break-over voltage, at which point the device "snaps" back to a low on-state voltage. The low on-state voltage means that the device dissipates less power and thus provides a higher surge-current-handling capability than does a clamping device. The disadvantage of crowbar devices is that the current through the device must fall below a vendor-specified holding current for the device to return to a nonconducting state.

Available technologies for parallel-protection elements include gas-discharge/surge arresters (commonly known as "gas tubes"), metal-oxide varistors (MOVs), and solid-state devices (transient-voltage-suppressor (TVS) diodes and TVS thyristors). Each type of device serves a specific application. In some cases, one may combine two or more device types to use the advantages of each.

Gas tubes employ an internal inert gas that ionizes and conducts during a transient event. The gas is contained in a glass or ceramic envelope with specialized electrodes placed at each end. When the voltage across the terminals reaches a certain level, the gas ionizes, causing the device to spark over, or "fire." At this point, the gas tube becomes a low-impedance path for the passing transient. The circuit voltage must fall below the gas tube's holdover voltage before the device extinguishes and returns to a nonconducting state. Because the internal gas requires time to ionize, gas tubes can take several microseconds to turn on. In fact, the reaction time and firing voltage depend upon the slope of the transient front.

Gas-surge arresters have a finite life span. As the gas tube wears out, leakage currents and firing voltages increase until total failure occurs. Also, if an impulse overstresses the gas tube, the hermetic seal may be breached, allowing the internal gas to escape and render the device useless. The gas tube's high-current-handling capability allows one to use the tube as a primary surge protector at connections to the outside world. The gas tube's high variable-firing voltages make the tube unsuitable for protecting solid-state circuitry at the board level. Break-over voltages typically range from 90V to 1 kV.

MOVs are nonlinear devices whose resistances vary with applied voltage. MOVs consist of a ceramic-like material, usually in a disk shape. One achieves high-transient capability by increasing the disk's size. The disk's surface is coated with a highly conductive metal to ensure uniform current distribution and is encapsulated with a plastic-epoxy material. The interface between the zinc-oxide and the metal-oxide matrix material is roughly equivalent to two back-to-back pn junctions. One can, therefore, view the MOV as several pn junctions in a series-and-parallel configuration. This configuration gives the MOV its characteristic VI curve, similar to back-to-back zener diodes.

MOVs gradually degrade with each transient event. Granular interfaces overheat and begin to short, resulting in a gradual decrease in breakdown voltage. Eventually, the MOV fails, and the device achieves a permanent low-impedance state, thus resulting in a loss of protection. MOVs turn on in a few nanoseconds and have high clamping voltages, ranging from approximately 30V to as much as 1.5 kV. The MOVs' high parasitic capacitance makes them unsuitable for use on digital T1 lines.

TVS thyristors are solid-state devices constructed with alternating layers of p- and n-type material. The resulting structure is similar to an SCR whose gate is controlled by an avalanche zener diode. TVS thyristors are crowbar devices that switch to a low on-state voltage when triggered. Because the on-state voltage is low, the TVS thyristor can conduct high surge currents. Again, the current through the device must fall below the holding current before the device returns to a nonconducting state. TVS thyristors do not wear out or exhibit the large overshoot voltage of gas tubes. Additionally, TVS thyristors respond in nanoseconds and have operating voltages starting at approximately 28V. The devices' unique characteristics make them well-suited for many telecommunication applications.

TVS diodes are solid-state pn-junction devices. A TVS-diode junction employs a large cross-sectional area so that the diode can conduct high transient current. By controlling such factors as junction depth, doping concentration, and substrate resistivity, the manufacturer can vary the device's target voltage. TVS diodes are clamping devices. When the transient voltage exceeds the circuit's normal operating voltage, the TVS diode becomes a low-impedance path for the transient current. The device returns to a high-impedance state after the transient threat passes. TVS diodes do not wear out and have no degradation of the electrical parameters, as long as it is operated within vendor-specified limits.

A primary attribute of a TVS diode is its reaction time. Avalanche breakdown theoretically occurs in picoseconds. However, this breakdown is difficult to measure, so manufacturers specify TVS diodes to respond almost instantaneously. TVS diodes are available in a range of operating voltages. Traditional discrete-device voltages range from 5 to 440V; recent innovations in TVS technology have yielded devices that operate at 2.8 and 3.3V.

TVS diodes have an inherent voltage-dependent capacitance, which can cause excessive signal degradation in high-speed data applications. Companies manufacture low-capacitance devices by placing a low-capacitance rectifier diode in series, but opposite in polarity, with the TVS diode. This placement adds another capacitor in series with the junction capacitor of the TVS diode. The resulting total capacitance is less than the smallest component in the series, according to the well-known formula for capacitors in series. By carefully choosing the rectifier, one can reduce the effective capacitance by approximately two orders of magnitude. TVS diodes' fast response time and low clamping voltages make these diodes ideal for use as board-level protectors for semiconductors and other sensitive components.

EXAMPLE

Quad TVS Diode Array for System Protection

The Protek Devices SLVDA2.8LC, available from Hunter Electronic Components Ltd., is a quad diode array for transient-voltage suppression (TVS) applications in low-power, portable and wireless systems.

The 4-line-pair device is designed to protect high-frequency data and video related systems from the damaging effects of electrostatic discharge, electrical fast transients and surge events.

The SLVDA2.8LC meets relevant national and international standards on circuit protection, including IEC 61000-4-2 (EN 61000-4-2), IEC 61000-4-4 (EN 61000-4-4) and IEC 61000-4-5 (EN 61000-4-5): Level 2 (for balanced or unbalanced lines).

Features of the device include four bidirectional TVS diode line pairs in an SO-8 package with an operating voltage of 2.8 V, a leakage current of less than 1.0 µA per line pair and a capacitance of less than 5 pF. The device is rated at 600 W peak pulse power for an 8/20 µs waveform.

I claim:

1. An electromagnetic pulse protected fuel cell power system comprising:
    a fuel cell for converting fuel into electrical energy;
    an electronic fuel cell controller; and
    an enclosure for containing said fuel cell and controller, where the enclosure is formed from one or more materials which dissipate or reflect electromagnetic pulse energy, so that the pulse strength within the enclosure is below a damage threshold of electronic devices enclosed within the enclosure;
    further including one or more openings in the enclosure, and where said one or more openings each include means to reflect or dissipate electromagnetic pulse energy, said means including at least one element made of a material to reflect or dissipate electromagnetic pulse energy.

2. A fuel cell power system as claimed in claim 1, further including one or more electrical lines entering or exiting the enclosure, said one or more electrical lines contain voltage or current spike suppression means sufficient to prevent damage to the electronic devices contained within the enclosure.

3. A fuel cell power system as claimed in claim 1 where said means to reflect or dissipate electromagnetic pulse energy comprises an electromagnetic pulse attenuating grid.

4. A fuel cell power system as claimed in claim 1 where said means to reflect or dissipate electromagnetic pulse energy comprises an electromagnetic pulse attenuating honeycomb cover.

5. A fuel cell power system as claimed in claim 1, further including one or more viewing ports in the enclosure, and where each of said one or more viewing ports include a said means to reflect or dissipate electromagnetic pulse energy.

6. A fuel cell power system as claimed in claim 5, where said means to reflect or dissipate electromagnetic pulse energy comprises a transparent conductive material coated onto the one or more viewing ports.

7. An electromagnetic pulse protected fuel cell power system comprising:
    a fuel processor for producing hydrogen from a hydrogen rich fuel;
    a fuel cell for converting hydrogen into electrical energy;
    a power conditioning circuit to control or modify output power of the fuel cell;
    an electronic controller for controlling the fuel cell or fuel processor; and
    an enclosure for containing the fuel processor, fuel cell, power conditioning circuit and electronic controller, where the enclosure is formed from one or more materials which dissipate or reflect electromagnetic pulse energy, so that the pulse strength within the enclosure is below a damage threshold of electronic devices enclosed within the enclosure;
    further including one or more openings in the enclosure, and where said one or more openings each include means to reflect or dissipate electromagnetic pulse energy, said means including at least one element made of a material to reflect or dissipate electromagnetic pulse energy.

8. A fuel cell power system as claimed in claim 7, further including one or more electrical lines entering or exiting the enclosure, said one or more electrical lines contain voltage or current spike suppression means sufficient to prevent damage to the electronic devices contained within the enclosure.

9. A fuel cell power system as claimed in claim 7 where said means to reflect or dissipate electromagnetic pulse energy comprises an electromagnetic pulse attenuating grid.

10. A fuel cell power system as claimed in claim 7 where said means to reflect or dissipate electromagnetic pulse energy comprises an electromagnetic pulse attenuating honeycomb cover.

11. A fuel cell power system as claimed in claim 7, further including one or more viewing ports in the enclosure, and where each of said one or more viewing ports include a said means to reflect or dissipate electromagnetic pulse energy.

12. A fuel cell power system as claimed in claim 11, where said means to reflect or dissipate electromagnetic pulse energy comprises a transparent conductive material coated onto the one or more viewing ports.

* * * * *